United States Patent [19]

Auspurg et al.

[11] 3,775,754

[45] Nov. 27, 1973

[54] DIAL-OPERATED DATA EXCHANGE SYSTEM

[76] Inventors: Heinz Auspurg; Forstenrieder Allee 208, Hans-Ulrich Möder, Albert Robhaupter Strabe 3a, both of Munich, Germany

[22] Filed: Mar. 10, 1972

[21] Appl. No.: 233,662

Related U.S. Application Data

[63] Continuation-in-part of Ser. No. 870,298, Sept. 11, 1969.

[30] Foreign Application Priority Data

Apr. 10, 1968 Germany .......... 5394

[52] U.S. Cl. .......... 340/172.5, 179/18 ES

[51] Int. Cl. .......... G06f 9/00, G06f 3/04

[58] Field of Search .......... 340/172.5; 179/18 ES

[56] References Cited

UNITED STATES PATENTS

| | | | |
|---|---|---|---|
| 3,029,414 | 4/1962 | Schrimpf | 340/172.5 |
| 3,116,410 | 12/1963 | La Manna et al. | 340/172.5 |
| 3,237,169 | 2/1966 | Hartwig et al. | 340/172.5 |
| 3,245,045 | 4/1966 | Randlev | 340/172.5 |
| 3,377,619 | 4/1968 | Marsh et al. | 340/172.5 |
| 3,389,376 | 6/1968 | Packard | 340/172.5 |
| 3,454,936 | 7/1969 | Bridge et al. | 340/172.5 |
| 3,517,123 | 6/1970 | Harr et al. | 179/18 |
| 3,591,722 | 7/1971 | Palsa | 179/2 |
| 3,660,824 | 5/1972 | Moder et al. | 340/172.5 |
| 3,685,018 | 8/1972 | Brandt et al. | 340/172.5 |
| 3,711,835 | 1/1973 | Jaeger et al. | 340/172.5 |
| 3,717,723 | 2/1973 | Jaskulke et al. | 178/3 |

*Primary Examiner*—Paul J. Henon
*Assistant Examiner*—Jan E. Rhoads
*Attorney*—William E. Schuyler, Jr. et al.

[57] ABSTRACT

A data exchange system of the dial-operated type having a central store to contain the operating relationships between the feeders and trunks of the system, and in which exchange functions are effected through special storage operations of the central store. The special storage operations are caused to be carried out between the read-out and write-in operations of a storage cycle, both to speed up operations and to prevent destruction of stored data by seizure of the system by a priority control unit.

4 Claims, 8 Drawing Figures

Fig. 2

| | SPOC | | |
|---|---|---|---|
| L | 0 | 0 | 0 |
| S | 0 | 0 | 1 |
| U | 0 | 1 | 1 |
| O | 1 | 0 | 0 |
| Ae | 1 | 0 | 1 |

DIAL-OPERATED DATA EXCHANGE SYSTEM

CROSS REFERENCE TO A RELATED APPLICATION

This application is a continuation-in-part of U.S. application, Ser. No. 870,298 filed Sept. 11, 1969, the priority of which is hereby claimed.

BACKGROUND OF THE INVENTION

The present invention relates to data exchange systems which are dial-operated, and have a central position-addressed store containing the operating relationships between feeders and trunks, and control units co-operating therewith.

We have recently investigated the possibilities of a data exchange system in which, at a central point, the changes in state within pieces of binary information and transferred from feeders to trunks, in each case marked by binary code words. Such a system is exemplary disclosed in the article "EDS–A New Electronic Data Switching System for Data Communication" published in "Nachrichtentechnische Zeitschrift," No. 8 Pages 444 to 463 (1969). This kind of exchange system contains a position-addressed central store, accessible via input code converters and input code multiplies, which store contains the operating relationships between feeders and trunks and any necessary data and programs for the operation of the exchange. Individual zones of this central store, for example store cells, are permanently assigned to the individual feeders. On arrival of a demand from a feeder for an exchange facility, its address is detected, an information path established to the relevant assigned storage cell, and the address of the desired trunk (destination etc.), is written into that storage cell, formed by the subscriber number dialed by the feeder. All the changes in state within the binary information, which occur during an existing connection, are transmitted in accordance with this relationship stored in the storage cell.

The storage cell, however, contains not only the relationship between feeder and trunk but also data about feeder and trunk themselves. (For example, data upon the classification or charge-metering function).

In order to make electronic exchange systems of this kind versatile in use, it is often necessary for further pieces of information to be available either alone or in combination with other pieces of information. Our investigations have shown that additional control units can be provided which co-operate via a demand control system and a selector circuit, with the position-addressed central store. The traffic between the control units and the store or central memory is effected on a cyclic basis. By cyclic cooperation, applicants are referring to the fact that a control unit, which has to carry out a particular exchange activity, directs a demand for a storage cycle to a demand control in the exchange. Simultaneously, address information is also directed to the memory through which a specific memory cell can be accessed. The formation of the address information, as is well known, takes place in the input code converter. It should be noted that the mode of formation of an address accessing a particular memory cell forms no part of the invention disclosed herein, and is a matter well known to those skilled in the art.

Each line connected to a control unit is assigned to a specific memory cell, so that from the number of the line the address of the memory cell assigned thereto can be formed without difficulty. With the assignment of the demanded storage cycle, which is accomplished in the selection circuit through coincidence, there exists an information connection between the demanded control unit and the addressed memory cell. During a memory cycle, information is read from the memory cell and/or written therein.

In an exemplary embodiment the memory or central store may be constructed from magnetic cores. If one uses a magnetic core memory, as is well known, by the reading out of the information, that information is destroyed. Thus, after each reading out of information, information must once again be written into that magnetic core. In the operation of magnetic core memories, it is known to define a cycle time in such a way that it includes the duration of the reading which destroys information, as well as the duration of the period during which information is rewritten in the memory. Between the read process and the write process of a memory cycle, there is always an interval or a pause. This fact is of fundamental importance for understanding of this invention. When, for example, it is stated that memory operations are carried out during a single memory cycle, by this, as is known, reference is made to the cycle time for magnetic core memories or the like, which includes a read process and a write process. (Cf. e.g. the book by R.K. Richards, "Digital Computer, Components and Circuits," 1957, p. 379). There is a pause between these two processes, whose length depends on the type of the store used. In this disclosure it may be assumed that the reading- and writing process is accomplished within 4 system pulses, and that the pause between the two processes is defined by 3 system pulses.

Further, to begin with, reference is made to the fact that a differentiation must be made between the above mentioned reading- i.e. writing processes and a reading- i.e. printing cycle. The latter comprise respectively a reading- and writing process. With the reading as well as with the writing cycle, the stored information is read out during the reading process and thereby destroyed. With the reading cycle, the information which was read out is entered in again unchanged during the printing process. In contrast, with the printing cycle a new piece of information is entered.

However, besides a reading- or writing cycle it should also be possible to join logically the information read out of the store with another piece of information present in the external unit. (According to the present state of the art, it is customary to read the information from the store with a first storage cycle and to transfer it into the external unit.) There it is then joined with another piece of information. The result is then again entered into the store in a timely subsequent cycle. As long as no very large real time demands are made on a data processing system, this procedure has no problems.

SUMMARY OF THE INVENTION

The problem to which the invention is directed, is that in an exchange system of the above discussed type, a plurality of control units do work with the central memory. Therefore, cycle demands are continually directed to the memory over the demand control device. Some of the control units are provided with a higher priority for their demands. Further, information read from a memory cell must often be processed in the control unit making the demand in conjunction with information already present in the control unit. Thus, after each information read-out from the memory, either this information or the new information arising from the combination of the memory information and the information in the control unit must again be written into the memory cell in question.

Because the control units are often in connection with the central memory over a multitude of gates and relatively long lines, reading of information from the memory and rewriting information therein has usually taken place in separately demanded cycles. Remembering however, that individual control units can be given various kinds of priority, the possibility of interim interference by a priority control unit, is a severe drawback. Such interim interference or break-in, occurs when, in implementing a command which requires both the transmission of information from the store to the control unit (read-out cycle), and also the transmission of information from the control unit to the store (write-in cycle), a priority control unit gains access to the store. Because the higher priority units will always receive the next available memory cycle, in some cases this next available memory cycle may well be the one that would have been used for rewritting information into a memory cell from which a read-out had just taken place. In this case the information written into the relevant storage cell by the priority control unit will be recorded over during the ensuing write-in cycle on the first control unit, and so destroyed.

One object of the present invention is to provide a system which overcomes this drawback.

The invention comprises a data exchange system of the dial-operated type in which a central position-addressed store is provided to contain the operating relationships between feeders and trunks, and in which control units co-operate therewith on the basis of a central program by means of a demand control unit, and wherein operations necessary for the execution of exchange functions are effected by special storage operations in the central store during a single storage cycle, each storage operation being carried out in the pause between the read-out and the write-in processes occurring within a storage cycle. By using special storage operations at the store itself, the individual pieces of information or the information formed by logic combination of individual pieces of information, can be written into the corresponding storage cell of the position-addressed central store in a single storage cycle, by program-controlled switch-through of information channels. This yields the further advantage that the storage operation which can be carried out within a single storage cycle is accompanied by an additional saving in terms of cycles and time.

In an especially useful embodiment, an operations gate arrangement is provided, which is constituted by a series of known logic gates for performing the functions described in the specification. Information is communicated to the operations gate from the memory as is information from the selected demanding control unit. As is known in the art of logic circuitry, it is also necessary to provide a control input to actuate the gates, as necessary, and these appear in the form of control signals. These control signals may emanate from any source, and in fact, they may be given off by the individual control units simultaneously with a demand for a memory cycle. If such is the case, the control signals will be transmitted over separate control lines to corresponding inputs of the operations gate unit. Because of the gate arrangement in the operations gate unit it is possible to switch through complete paths to connect the information (bi) from the address memory cell available at the end of the reading process with the information (ai) offered by the demanding control unit. This combination of information can be carried out during the pause between the reading operation and the writing operation of a given memory cycle. At the beginning of the write operation, of the same cycle, the new information is then available at the output of the gate unit and is written into the memory in the same memory cell. The new information can also be passed on to the control unit to which this memory cycle was assigned. This operation takes place during one and the same memory cycle and always during one cycle only. Thus, during one memory cycle a selected control unit can exchange information entirely with one memory cell.

In an especially useful embodiment, an operations gate circuit is provided at the store, to which are directed the information from an external processing unit over a first register (word input register), the information read from the store over a second register (word output register), and the control signals sent by the external processing units over control inputs (the logical switching elements in the operations gate arrangement circuit being controlled by the latter signals). A storage operation, independent of its type (reading, writing, single or double combination, reading-altering), is thus always executed with a single cycle, whereby the execution of logical linkings occurs during the time of the pause between the destroying reading and the reentering, which happens with each core store cycle.

BRIEF DESCRIPTION OF THE DRAWING

The invention will now be described with reference to the accompanying drawings, in which.

DETAILED DESCRIPTION OF THE DRAWINGS

In describing the explanatory embodiments hereinbelow and in making reference to the drawings like reference letters and/or numerals will be usd to refer to like elements of the disclosed apparatus.

Figure 1:
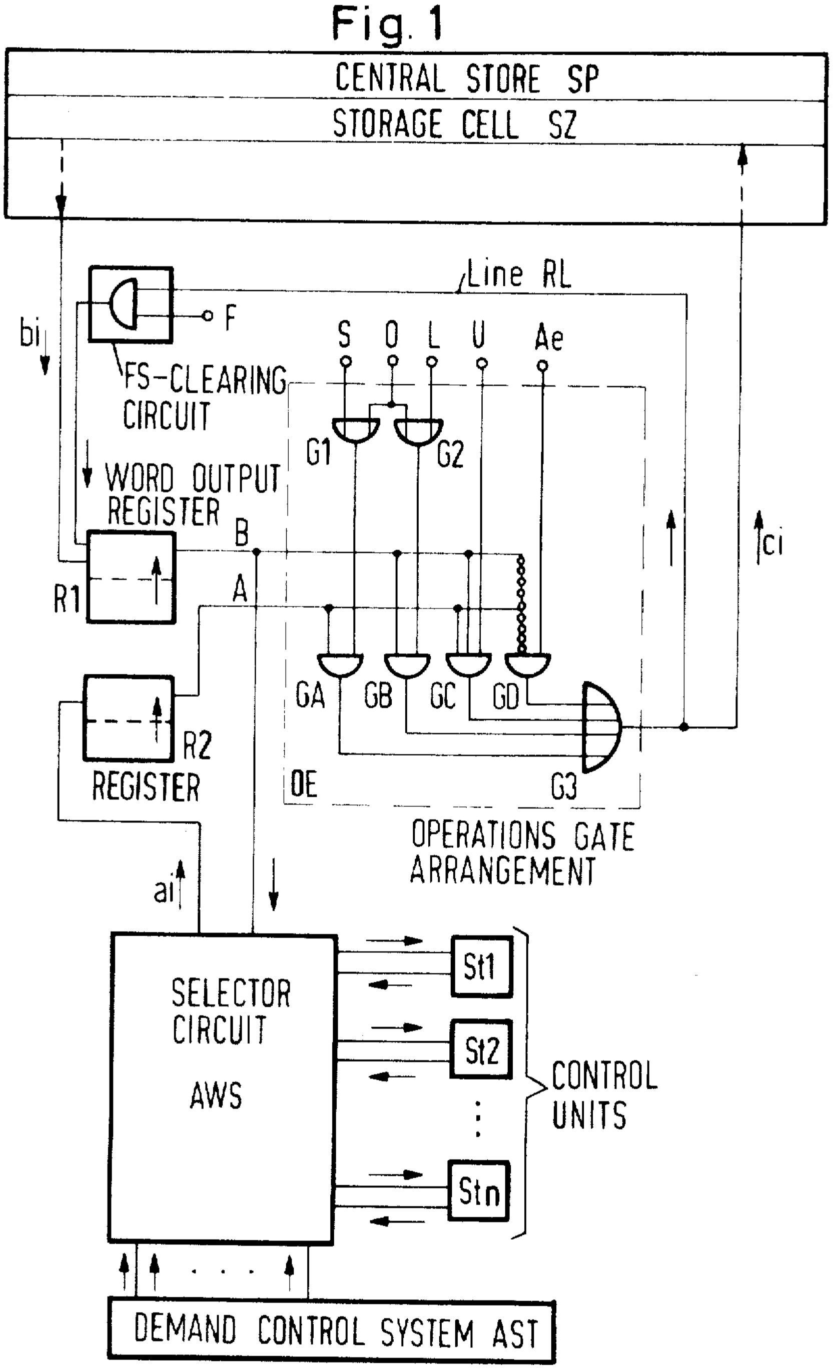
FIG. 1 is a schematic circuit diagram of one exemplary embodiment of the invention.
Figure 2:
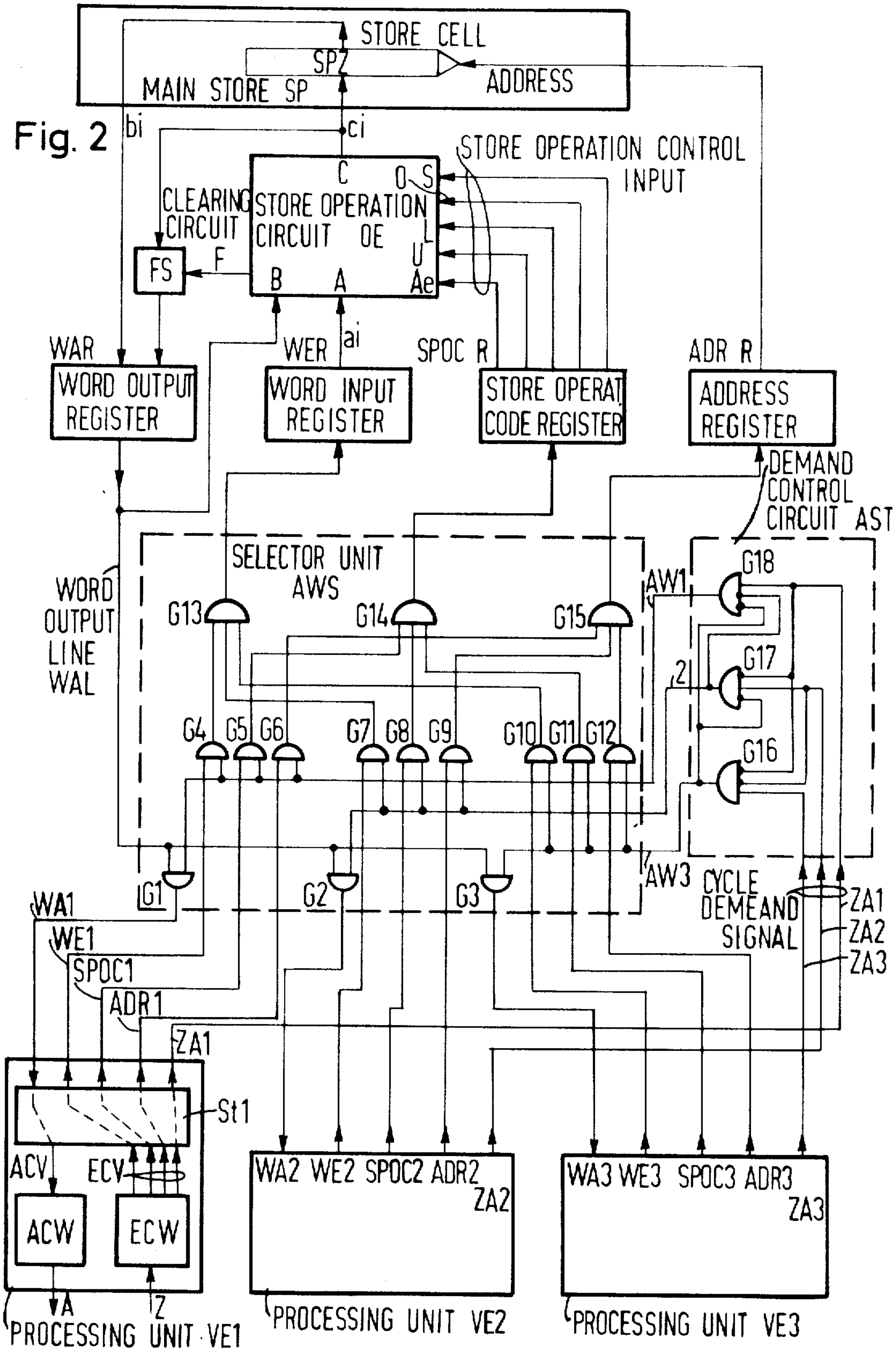
FIG. 2 is a detailed schematic diagram of an embodiment of the device of FIG. 1.

In the lower part of FIG. 2, in a processing unit VE1 input and output code converters, ECW and ACW respectively, are shown, to which feeders Z and trunks A are connected. The code-converters are connected via an input code multiple ECV and an output code multiple ACV, to a control unit, Stl, which in turn connects the code converters, responsive to a demand signal, to a central store SP, one at a time, of which the drawing shows one specific storage cell SPZ. There are in fact several control units, Stl to Stn, (see FIG. 1) each having associated feeders and trunks, and these control units are triggered by a selector circuit AWS controllable through a demand control system ASt, operating on the demand signals one at a time, to produce or receive pieces of information. The addressing of a memory cell takes place when a demanding control unit is identified by an address information produced by the input code converter ECW, and a specific memory cell assigned only to this demanding control unit is reached. In the central part of FIG. 1, an operations gate arrangement OE is shown, which has access both to the central store SP and to the individual control units Stl to Stn. The pieces of information formed in the operations gate arrangement OE pass thence to the addressed storage cell of the central control SP, and can also be passed via a first register R1 into any selected one of the control units *Stl* to *Stn*.

To provide for the various storage operations taking place in an electronic data exchange system, the operations gate arrangement OE has several control inputs, S, O, L, U and A*e* by means of which the operations gate arrangement OE is driven for each storage cycle, in accordance with the storage operation desired by a selected control unit. These operations are the non-combining operations of "write-in" (S) or "read-out" (L), According to the invention there are provided, as well, special storage operations, and these are the combining operations "OR" (O) and "AND" (U) and the operation Ae which is called a read-out and modify operation. As will be explained in detail later, the various special storage operations are implemented by the selective connection of information channels within the operations gate arrangement OE, between information inputs and information outputs. The operations gate arrangement contains three OR gates, G1, G2, and G4, three AND gates, GA, GB, GC and GD.

The mode of operation of the embodiment shown in FIG. 1 will be explained in greater detail, but it is thought sufficient to confine ourselves to basic operations such as "read-out" or "write-in," and the simple combining operations such as "AND" and "OR." To simplify matters, the discussion of the operation will be limited in each case to an information flow of one work bit. The "read-out" command starts the cycle of read-out from the assumed addressed storage cell SPZ, and also selects the input L of the operations gate arrangement OE which is connected via the gate G2, and opens the gate GB. Thus, an information bit (bi) read out of the storage cell can pass via first register R1 and the gates GB and G3 to the information output of the operations gate arrangement OE. Thence, the information erased from the store by the read-out operation is written back into the addressed storage cell SPZ in the same cycle. This information is also transmitted to the selected one of the control units Stl to Stn. This operation can be effected via the selector circuit AWS, as shown in FIG. 1. In a similar fashion, the "write-in" type of operation is carried out, by selection of the input S, which is connected via the gate G1 to open the gate GA for a piece of information (ai) contained in a control unit, so that the information (ai) received from a control unit Stl to Stn selected via the demand control ASt and the selector circuit AWS, passes via the second register R2 and the gates GA and G3 to the information output of the operations gate arrangement OE. Thence, this new information (ci) is written into the addressed storage cell.

If it is required to obtain the combination of individual pieces of information from the central store and the control units, then, one of the operations gate arrangement inputs assigned to this kind of combining operation, e.g. O or U, is selected. For "OR" type operation the input O is selected, which is connected via the two gates G1 and G2, to open the two gates GA and GB, so that pieces of information contained in the store and in the selected control unit can pass to the information output of OE via their respective gates GA and GB, and thence via the common gate G3, to produce a disjunctive combination of the information (bi) read out of the store and the information (ai) read out of one of the selected control units, whence it is written into the addressed cell of the store. In a similar way, conjunctive combination is carried out by selection of the input U of the operations gate arrangement OE, which is connected via gate G1 to open the gate GA, and is also connected directly to open the gate GC, so that information contained in the addressed storage cell of the central store and in a control unit can pass via separate routes.

It will be seen from this example that the operations of both "read-out" and "write-in," as well as the operations "AND" and "OR" characterized by logic combinations, are storage operations which can be carried out in a single storage cycle. With the arrival of the corresponding operations command at one of the control inputs of the operations gate arrangement OE, there simultaneously commences the input of the information, i.e. either the reading out of a piece of information (bi) from the addressed storage cell or the reading out of a piece of information (ai) from a control unit. At the end of the read-out operation, processing of the information starts immediately. To this end, certain information channels within the operations system are cleared. This takes place in the pause elapsing between the read-out and write-in processes of a storage cycle. The ensuing write-in of the newly obtained information (ci) into the addressed storage cell, is terminated with the end of the storage cycle.

Thus, the objectives referred to above, namely that interim break-in at the store by a priority control unit should not be possible, and that the time required for operations should be reduced, are both achieved in this embodiment. The first register R1 provides the facility, in all storage operations, of additionally picking up in the selected control unit the information read out of the storage cell. This makes possible a further advantageous method of operation the read-out and modify operation AE. Via a further input Ae of the operations gate arrangement OE, the additional gate marked GD can be controlled to determine in respect of each bit of the word whether the information read out of the store SP or the information to be received from a control unit, is transmitted to the information output of the operations gate arrangement and therefore in the central store SP. Within a single storage cycle, it is therefore possible to carry out a "read-out and modify" storage operation. To this end, all that is required is a single relationship, for example one wiring arrangement per bit, which is indicated in FIG. 1, by the composite line to the input of the gate GD. For example, to carry out a typical telephone exchange switching process requiring the transmission of information from an incoming connection Z to an outgoing connection A, (although this is not the subject of this application, and accordingly, is not described) in addition to the address of the outgoing line A, information about the last polarity is also necessary in the selected control unit S*t*. Likewise, an information about the new polarity must be written in the memory. In order to avoid that a read cycle (followed by a writing in of destroyed information) and a second write cycle, with which the changed information is written in the memory, must be demanded, the control input Ae is activated from a control unit, the information bi is read from the memory and transmitted to the demanding control unit (over the output of the register R1) and simultaneously, the new information *ci* is written into the memory cell. As is clear from the specification, this process can occur during one single memory cycle.

A further advantage of this embodiment resides in the fact that double combinations are possible. To this end, a line RL is connected from the information output, of the operations gate arrangement OE to the information input of the register R1, via a clearing circuit FS which will be described later. This operation is effected in the following manner. First of all, the information read out of the store SP is combined with a piece of information *ai* read out of a selected control unit S*tl* to S*tn*, for example in a disjunctive way. The gates GA and GB are open, so that the new information (distinctive combination of ai and bi) passes via the gate G3 information output of the operations arrangement OE. This piece of information which we will call the intermediate result, passes via the return line RL back into the first register R1 and thence into the operations gate arrangement OE. The control of this second input operation is effected via an input F of the clearing circuit FS. In the operations gate arrangement OE, the information corresponding to the intermediate result is then available for processing afresh. It can be combined again with a succeeding piece of information from the selected control unit and is transmitted to the information output again. Because the writing operation of the memory cycle has not yet begun, the intermediate result is not written into the memory as yet. If the clearing or release circuit FS is open, then register R1 receives this information directly and makes it available to the unit OE so that a second connection can take place based on a control signal transmitted from the pertinent control unit. When this is completed the operation of write-in into the address storage cell commences. This kind of double combination can be used, for example, when only parts of a piece of information are used in a specific combining operation. Because the operations take place during a single memory cycle, the relationship between the control unit in question and the particular memory cell is constant.

A further advantage of this embodiment resides in the fact that because of the intermediate storage of the read-out word in the register R1, it is possible to carry out parity checking, at the store for example.

As shown, the first register R1 is a the word output register and serves to receive the information read out of an addressed storage cell. The second register R2 is a word input register which serves to receive the information supplied by a selected control unit. Because the two registers R1 and R2 operate in parallel in this embodiment, there is a high speed of operation although the advantages of forming an intermediate result, of intermediately storing read-out information in the register R1, and of receiving the information contained in the register R1 in one of the control units, are provided.

The invention is not limited to the storage operations described with reference to FIG. 1. Other storage operations can be carried out. For example, combination operations, requiring other storage operations, are possible, provided that these operations can be carried out in a single storage cycle, to avoid the disadvantages listed in the introduction.

If we dispense with the saving in time introduced by working within a single storage cycle, then by using corresponding control commands from a central program control arrangement, several cycles can be operated immediately successively in respect of the same control unit. In this case, too, the drawback of interim break-in, introductorily referred to, is avoided.

The following description utilizes logic and timing diagrams to detail the exemplary embodiment of FIG. 1. In FIG. 2 which is a detailed schematic diagram of the embodiment of FIG. 1, three processing units (VE1 to VE3) are shown of which each has an output to emit a cycle demand signal ZA, an output to emit a storage operation code SPOC, an output to emit an address datum Adr and an output to emit a word datum WE. The processing unit can receive a word WA over an input. The cycle demand signal ZA is a signal which consists of a single bit. The address datum *Adr*, the transmitted word WE and the recevied word WA consist of course of several bits respectively (eg. *Adr* = 15 bits, *WE* = 24 bits, *WA*= 24 bits). The storage operation code SPOC is the binary data designating the logical operation in the operations gate circuit OE. It consists, for example, of 3 bits, which can be combined in the following way:

| Store Operation | SPOC | Store Operation Control Input |
|---|---|---|
| Read | 0 0 0 | L=1; S=0; U=0; O=0; Ae=0 |
| Print | 0 0 1 | L=0; S=1; |
| Or | 1 0 0 | L=0; S=0; U=0; O=1; Ae=0 |
| And | 0 1 1 | L=0; S=0; U=1; O=0; Ae=0 |
| Read/change | 1 0 1 | L=0; S=0; U=0; O=0; Ae=1 |

Figure 7:
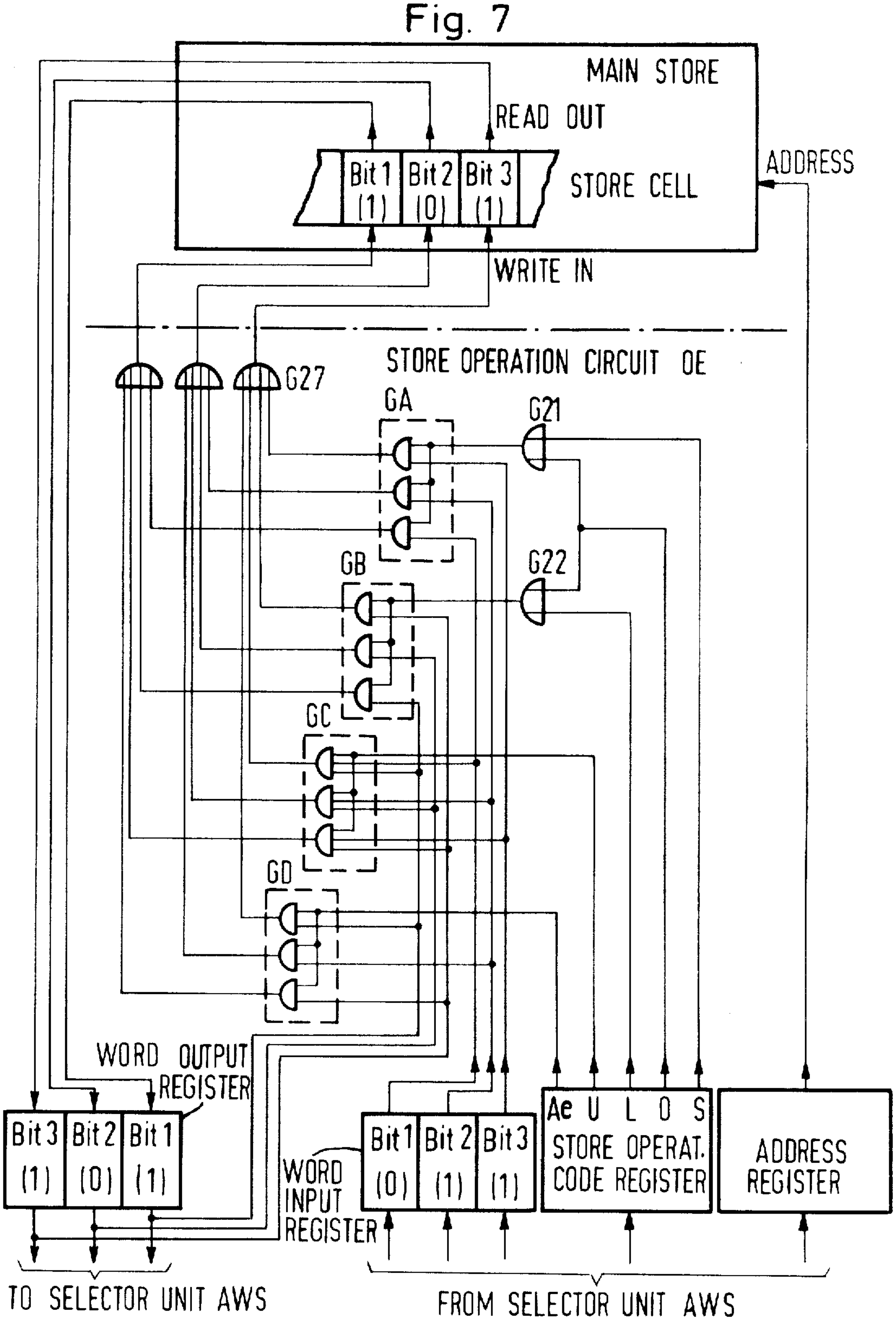
FIG. 7 is a schematic diagram of yet another embodiment of the device of FIG. 1.

It has been assumed in FIG. 2 that the data consist respectively of a single bit. However, FIG. 7 shows how the circuit can be expanded when the data consist respectively of more than one bit.

The signals and data (ZA, A*dr*, SPOC, WE) are formed in the input code converter ECW. Data are thereby available, which for example arrive over a line in the form of telephone signals. In this case the address is formed from the connection number of the line and the input word is formed from the arriving message. The storage operation code is determined by a permanent wiring or by a store word being previously supplied. The signal ZA is generated with the arrival of the information. The individual data are distributed over the control unit St to the applicable outputs. The word WA received from the store is decoded in the output code converter ACW. Therefrom one receives for example the connection number and the message for a line or the storage operation code for a following desired operation.

Figure 3:
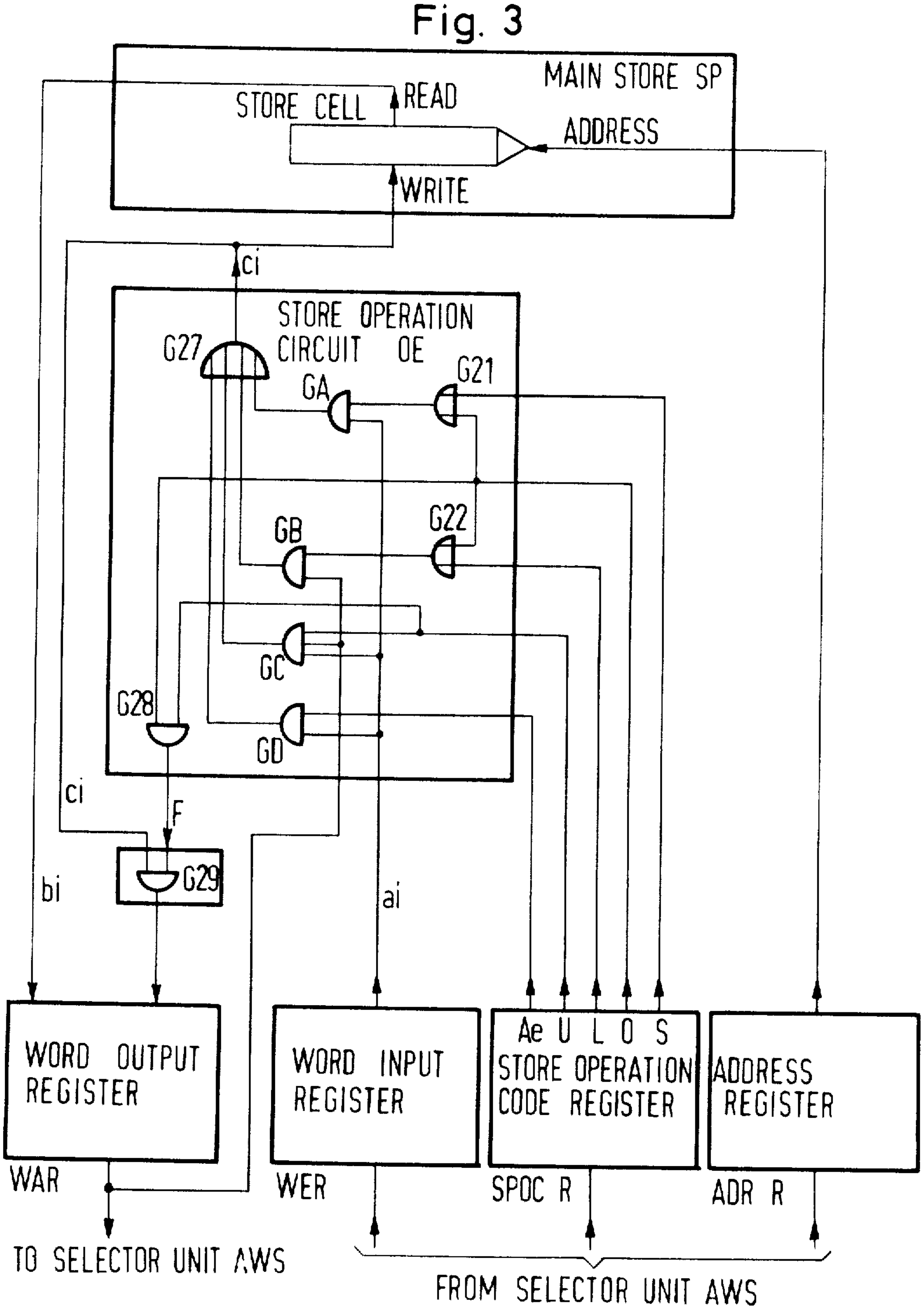
FIG. 3 is a detailed schematic diagram of a portion of FIG. 2.
Figure 8:
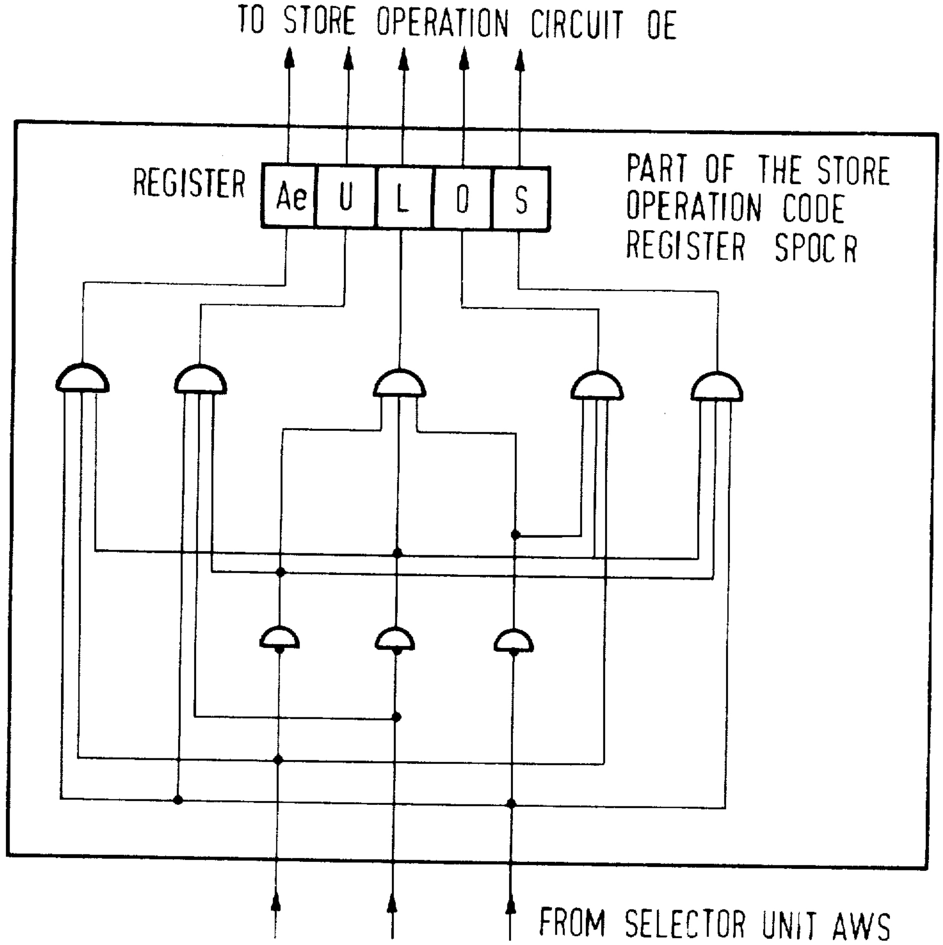
FIG. 8 is a detailed schematic diagram of a portion of FIG. 7.

A processing unit VE which desires access to the store sends the cycle demand ZA, e.g. in the form of a logical 1. The signal ZA is evaluated in the demand control system ASt in such a manner that always only a single selection signal AW is developed there. If, for example, the processing unit VE1 sends the signal ZA1, then the gate G18 in the demand control system ASt becomes opened, so that the selection signal AW1 is available, with which the inputs of the AND-gates G4, G5 and G6 in the selection circuit AWS are opened. Simultaneously or immediately after the ZA1-transmission, the processing unit VE1 sends the address Adrl, the storage operation code SPOC1 and the word WE1 which is to be transferred to the store. These data are forwarded over these gates corresponding to the adjoining information content and arrive over the OR-gates G15 (for the address Adr), G14 (for the storage operation code SPOC) and G13 (for the word to be fed in) in the corresponding registers AdrR, SPOCR and WER. A specific storage cell SPZ in the store SP can be controlled by the address. The input S, L, U, O, Ae of the gate circuit OE corresponding to the operation to be executed is controlled by the storage operation register. FIG. 3 may be referred to to understand what happens when a logical 1 is applied to the applicable input. (FIG. 8 shows further how the appropriate control signal S, O, L, U *Ae* is generated from a 3 bit code. Such a circuit is of course conventional and well known.) the information datum (ai) (which is identical to the word WE) presented by the applicable processing unit is available at information input A of the gate circuit OE over the word input register WER. (The operations gate circuit OE is shown in detail in FIG. 3). The gate circuit OE is connected with the store SP through output C and transfers to it the information ci into the storage cell defined by the address. The datum (bi) which is read out of the storage cell SPZ is supplied to a word output register WAR. From there it is available for renewed entry into the gating circuit OE (through the information input B) as well as at all gate inputs G1 to G3 of the selection control AWS, over the word output line WAL. However, it is transferred to the applicable processing unit only through the gate which was opened by the applicable one of the selection signals AW1 to AW3, i.e. in the example only through the gate G1.

It is clear from the detailed description of the demand control circuit ASt, which contains the gates G16 to G18 and at which the cycle demand signals ZA1 to ZA3 arrive, that there is an exact association between the storage cell SPZ in the store and the corresponding processing unit, with transfer of information from a processing unit into the store as well as with transfer of a datum from the store into the processing unit. Thus, for example, as was indicated in the foregoing, if the cycle demand ZA1 is generated, then only the gate G18 in the demand control ASt is open whereas the gates G17 and G16 are closed as a result of the signal ZA1, which is applied inverted. As long as the cycle demand ZA1 is present, no other cycle demand is considered. Only after the cycle demand signal ZA1 has ended are the other gates again released, so that the next cycle demand may be evaluated, which again is signalled by emission of s single selection signal AW. If the signals ZA2 and ZA3 have arrived in the meantime, then the higher-order signal ZA2 is considered next. (There is still an " 0" at the gate output G16; there is again an "0" at gate input G18; through the inversion of these logical states at gate G17, only this gate is prepared to pass the signal ZA2.) In similar way if during the evaluation of the signal ZA2 the first and the third signals ZA1 and ZA3 arrive, the higher-order signal ZA1 is always considered first.

Figure 4:
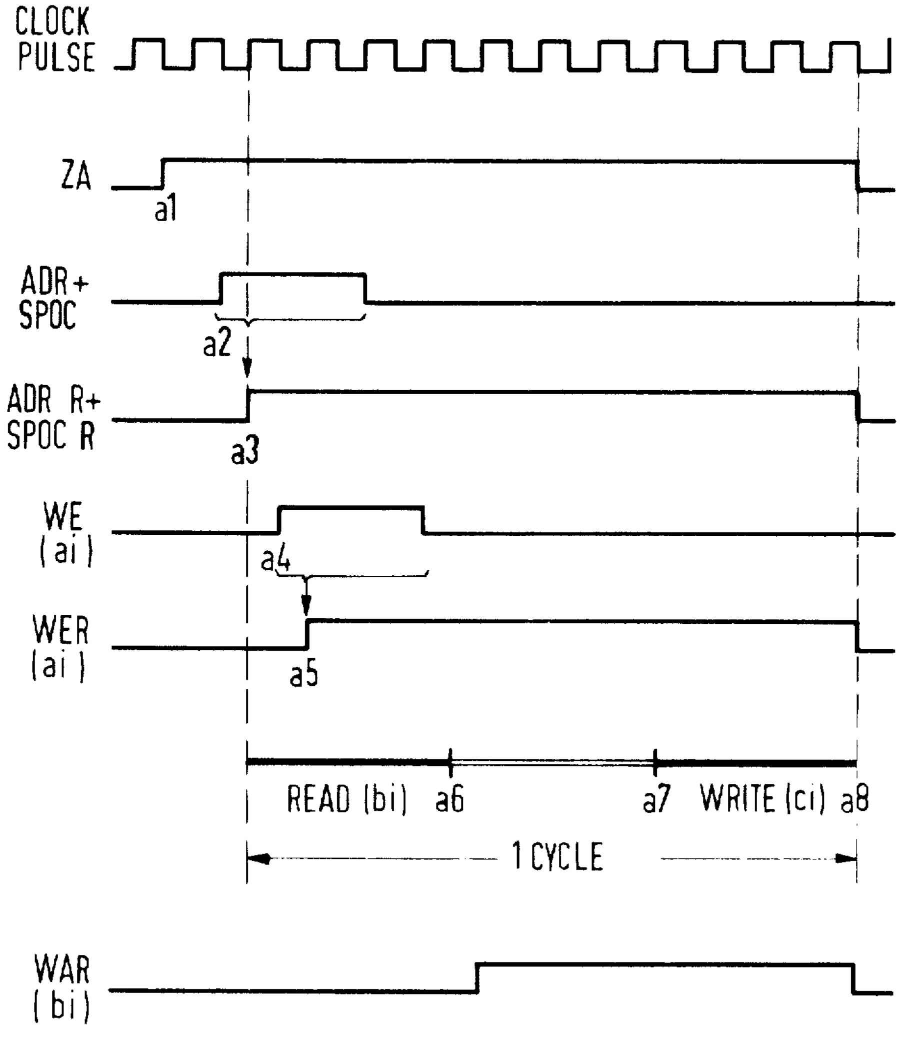
FIGS. 4–6 are timing charts of the processes carried out in the embodiments of FIGS. 2 and 3.
Figure 6:
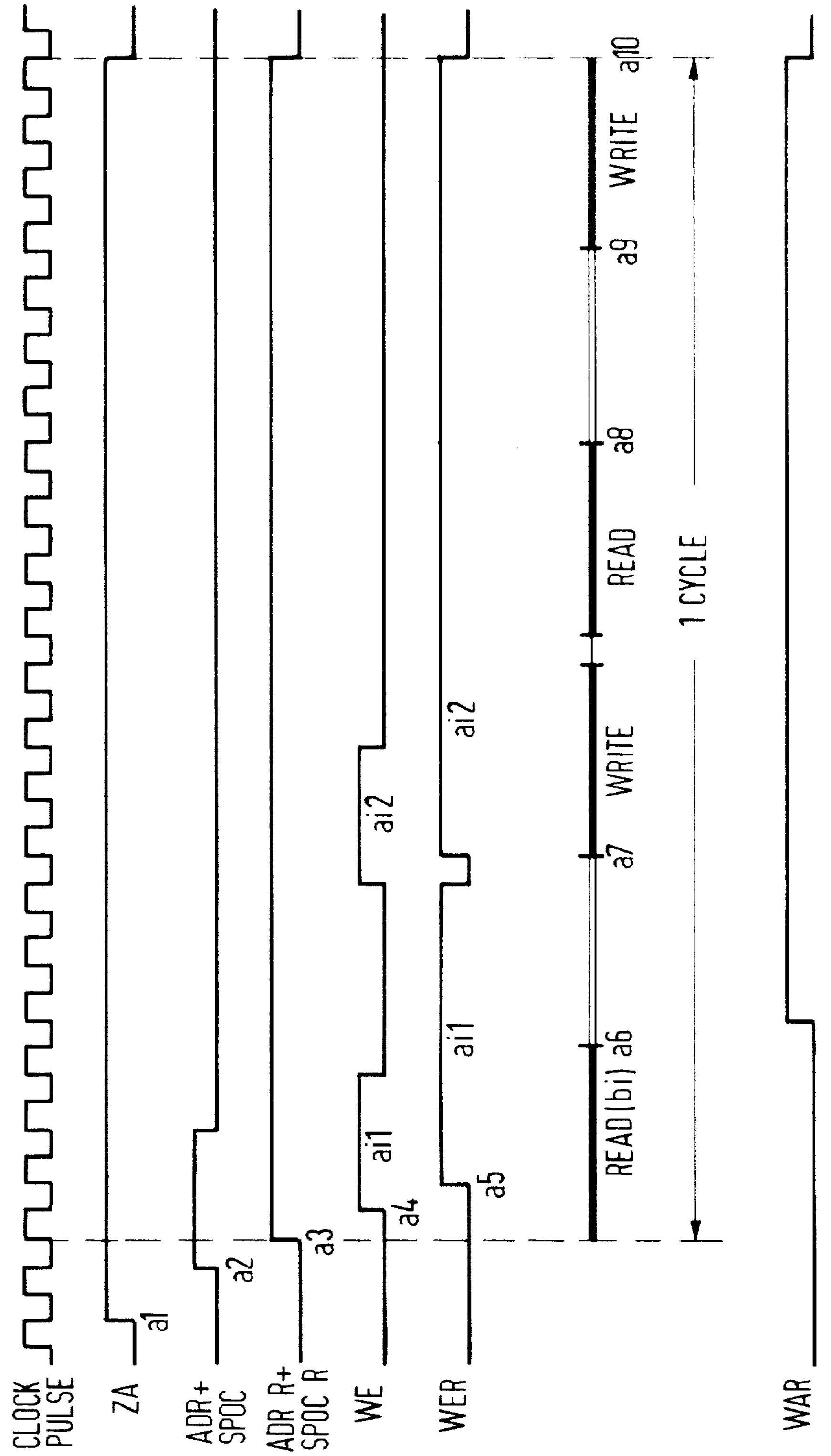

FIG. 6 provides a timing chart which further clarifies the processes "read" and "write." There, in the first line, the system clock pulse is displayed, whereas in the following lines the individual signals and data are represented as a function of time. If at moment al a cycle demand ZA occurs and at moment *a*2 the address A*dr* and the information about the storage operation code SPOC are present, then with the next succeeding pulse at moment *a*3 the cycle can be started. It is assumed that at moment *a*3 the address and the storage operation code are shifted into the address register A*dr*R and into the storage operation code register SPOCR respectively. At moment a4 the input data word WE arrives, which is shifted into the word input register WER at moment *a*5. This data corresponds to the data *ai*. With the start of the cycle at moment *a*3, the data contained in the store, i.e. the data bits contained in the addressed cell, is read out. This reading process is ended at moment a6 and the information which has been read is transferred into the word output register WAR. If the type of operation is "read," in which the control input L carries a logical 1 and the word input register WER contain no information ($ai = 0$), then as appears from the operations gating arrangement in FIG. 3, over the control input L only the AND-gate GB is opened over a first input and accordingly the logical state at its output always corresponds to the data read out of the store, *bi*. Thus the data which was read out is entered in again unchanged ($ci = bi$). In this case the information which was read out, *bi*, is transferred to the processing unit whose cycle requirement had been selected, through the word output register WAR, the word output line WAL and one of the gates G1, G2 or G3. That can happen at the end of the cycle, as shown in FIG. 4. The information destroyed in reading the storage cell is reentered unchanged. At moment *a*8 the cycle is ended, and simultaneously the cycle demand ZA is switched off and the feed-in registers A*dr*R, SPOCR and WER are cleared. If the type of operation is "write," then the control input S carries a logical 1. As shown in FIG. 3, the AND-gate GA is opened exclusively through a first input, so that it always assumes at its output the logical state. which is indicated by the information ai which is to be entered. It this case, therefore, the information contained in the word input register WER is entered. Also here a cycle is ended at moment *a*8, the cycle demand ZA ends and the corresponding input registers are cleared.

The execution of the logical operations "AND" "OR" occurs as described with reference to these timing charts of FIGS. 4–6. At moment al the cycle demand ZA of a processing unit has been selected; the address and storage operation code information is transmitted at moment *a*2. At moment *a*3 these data are transferred into the corresponding registers A*dr*R and SPOCR. Simultaneously the cycle is started. The word input information WE transmitted by the processing unit at moment *a*4, which corresponds to the information (ai), is shifted input the word into register WER at moment *a*5. At the end of the reading process the information *bi*, which was contained in the addressed storage cell, is available at moment *a*6, and is received into the word output register WAR. With the type of operation "AND," the input U carries logic 1. FIG. 3 shows that the AND gate GC is thereby opened over a first input and that the information emitted at the output of this gate is always the "AND"-combination of the data (ai) and (bi). It is entered as data (ci) into the addressed storage cell with the print-process of the cycle.

At the end of the print-process at moment *a*8 the cycle requirement ZA ends and the feed-in registers are cleared.

If the "OR" function is desired, then the input 0 carries a logical 1, which, as is shown in FIG. 3, has as a consequence the fact that the AND-gates GA and GB are energized over one input each respectively. Since the second inputs of these two gates are connected respectively with the input register and the output register, the data (ci) always results as the OR-combination of the data (ai) and (bi). This information is entered in the addressed storage cell during the print-process. At the end of the print-process at moment *a*8, the cycle demand is again extinguished and the feed-in registers are cleared. In both cases it is possible to transmit the data *bi* read from the storage cell, which is transferred to the word output register WAR, to all processing units over the word output line WAL, of which however only thoes ones whose cycle demand signal was evaluated can receive this information. Since with "print" and "read" as well as with an "AND" and an "OR" combination the same number of gates are traversed, the cycle duration is equally long in each instance. Through placing the gate circuit OE directly adjacent the store as well as through the advantageous connection of the gates within the operations gate arrangement OE, the result is achieved that the operations can be executed within the pause between a reading- and a printing-process. An intermediate access is not possible.

Figure 5:
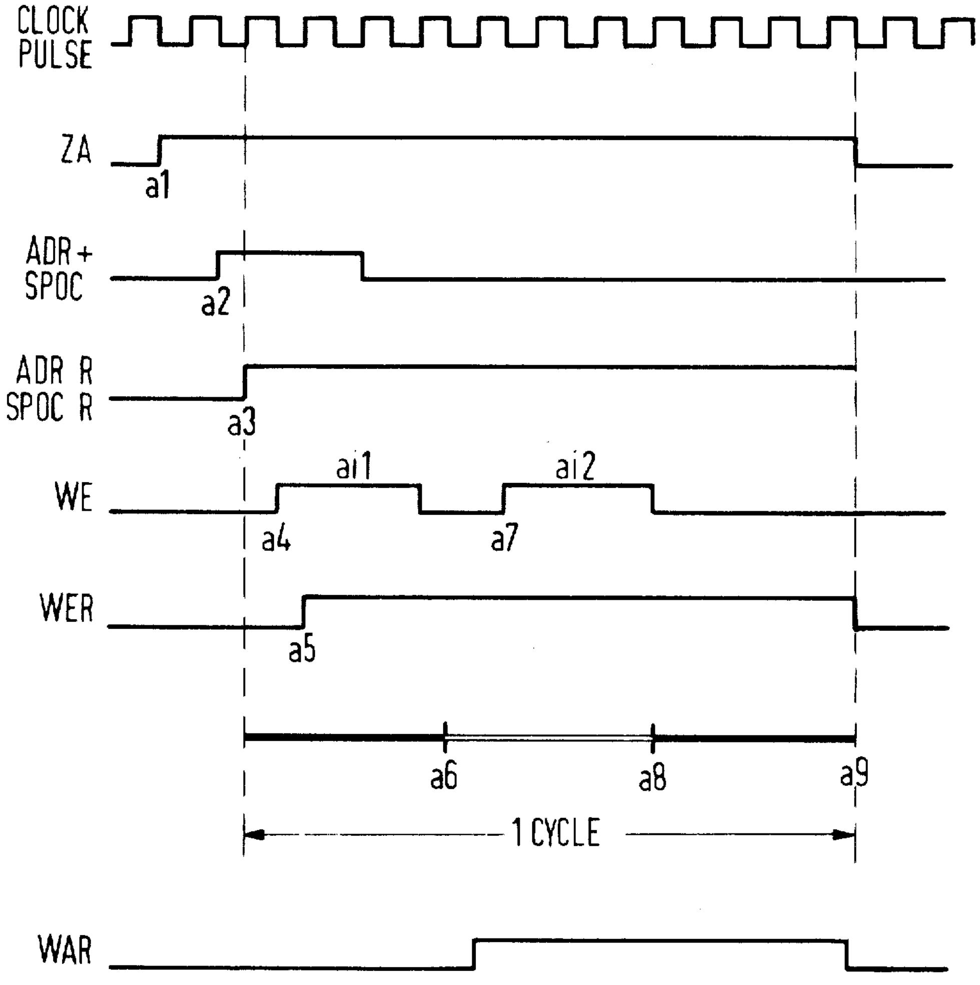

The possible double combination mentioned above in connection with FIG. 1 is further explained with the aid of FIGS. 5 and 6. FIG. 2 shows the double combination using the clearing circuit FS; in FIG. 6 the double combination is achieved by stringing together successive storage cycles.

For the sequence shown in FIG. 5 it is necessary that the processing unit, which transmits a cycle demand ZA, emits two partial words in timed succession, namely the partial word (ai1) for a first combination and the partial word (ai2) for a second combination. With the start of the cycle at moment a3 the reading out of the data contained in the storage cell, (bi), begins; it is transferred into the word output register WAR at moment a6. Under the assumption that the control input 0 carries a logical 1, the OR-combination of the data (ai1) and (bi) is carried out between the moments *a*6 and *a*7. The intermediate result is emitted over the gate G27 and applied to an input of the release gate G29. With the release of gate G29 (which for example can occur dependent on what the input U carries) the intermediate result is fed into the word output register WAR and is combined anew with the timely following arriving information (ai2). Here the important thing is that the second datum (ai2) is available when the intermediate result is applied to the operations gate circuit OE by the word output register WAR. Since the transfer of information in a data processing system from one register into another depends on the system clock pulse, however, this requirement can readily be met. The second combination takes place between the moments *a*7 and *a*8. The data ci now appearing at the output of the gate G27 is then entered into the storage cell in a known manner. This process is ended at moment *a*9. Also in this case the whole operation is finished with one cycle.

The possible achievement of double combination shown in FIG. 6 takes place without return over the clearing circuit FS. In this case the first partial word (ai1) of the input data, which arrives first, is combined with the data bi read out of the storage cell between the moments *a*6 and *a*7. (Eg. AND-combination (ai1) with (bi).) This intermediate result, which can be termed *ci*1, is entered into the storage cell with the following print process. In contrast to the previous examples, in this process neither the cycle demand nor the feed-in register is cleared. The cycle following immediately thereafter leads to the result, during the reading process, that the information (ci1) is read out and entered into the word output register. In the pause between the moments *a*8 and *a*9, the intermediate result is combined with the second partial word (ai2) which arrives later. The final result (ci) of the double combination is again entered into the storage cell. At the end of this print process, at moment *a*10, the cycle demand ends as well as the input register being cleared. This cycle of course lasts twice as long yet it appears, as viewed from the external units, as a single cycle. An intermediate access is not possible.

An important characteristic of the invention under consideration is the "read- change" operation. This process means that a word read out of the storage cell is transferred into a porcessing unit, whereafter individual bits of the word are changed when the read-out word is reentered. Since this process may not be clearly explained by means of the schematic diagram of FIGS. 2 and 3, for which an information flow of one bit is postulated, reference should be made to FIG. 7, in which an information flow for a 3-bit word is assumed. FIG. 7 shows the operations gate circuit OE with the modifications which are necessary when the data which are to be entered into the store i.e. which are to be read out of the store, represent a 3-bit word. The word input register WER as well as the output word register WAR are, accordingly, three stage registers, i.e. a register storage place is provided for each bit of a word. Further, the AND-gates GA, GB, GC and GD are provided in triplicate. The controlling and the connecting together of these gates with the operations gate circuit OE corresponds to the arrangement shown in FIG. 3. Also the previously described operations like "print," "read," "AND-combination," "OR-combination" as well as a double combination function proceed here in the same manner as described before. The difference between this embodiment and the embodiment shown in FIG. 3 consists in the fact that the data (ai), (bi) and (ci) each consist of three bits. These individual operations therefore need not be described further. As to the operation "read-change," which as yet has not been described, in the arrangement of FIG. 7 it is assumed that the data read out of the addressed storage cell SPZ shall be accepted by a processing unit, whereas in entering this information only the bit 2 shall be changed. Thus by "bit-wise wiring," as the term is used above, it is meant that only that outlet of the operations gate circuit OE, over which the applicable bit position in the storage cell can be controlled, is controlled with the new bit information. In other words, a through-switched path from the word input register WER through the operations gate circuit OE to the store is therefore present only for bit 2. FIG. 7 shows that only the middle gate of the gate arrangement GD is connected with the word input register WER and, therefore, with the place in which bit 2 is contained. If one assumes that the information in the word input register reads 011 and the information 101 is contained in the storage cell, then, when the cycle is started, this information ($bi = 101$) is transferred into the word output register and received at the processing unit whose cycle requirement was selected. For the print process within the cycle, the data of the word output register WAR and the data of the word input register WER are available in the manner determined by the wiring at the input of gate arrangement GD. The first and the third bit are again entered unchanged into the storage cell over the first and third gates of this gate arrangement. Only the second input of the second gate of gate arrangement GD is connected with the word input register WER and thus with the second stage, in which the information for bit 2 is held. Bit 2 in the storage cell is therefore changed by the information offered over the word feed-in register. This description of course is merely exemplary.

It is assumed that the data provided by the processing units over the selection circuit arrive in a word input register at the gate circuit OE, from there are transferred directly into the store and that the data read out of the store arrive in a word output register. This arrangement corresponds to FIG. 1 of the disclosure above, whereby the word input register is denoted there by R2 and the word output register by R1.

The embodiments of the invention and process descriptions thereof set forth hereinabove are considered to be only exemplary, and it is contemplated that changes and modifications may be made thereto within the scope of the appended claims.

We claim:

1. In a dial-operated data exchange having a plurality of control units, each of which is connected to a feeder and a trunk, each of said control units having an assigned priority and including means for sending a demand signal responsive to a signal on the feeder connected thereto for establishing a connection with a central store, said central store containing information regarding operating relationships between said feeders and said trunks, said system including demand control means for producing a select signal responsive to a demand signal in accordance with its predetermined priority, at a given time, thereby selecting a given control unit emitting said demand signal having said predetermined priority and selector means for connecting said selected control unit to said central store responsive to said select signal, the improvement comprising:

first and second register means, operations gate means for connecting a first information input terminal connected thereto to said central store through said first register means and for connecting a second information input terminal connected thereto through said second register means and said selector means to selected control unit for read and write operations, means in said control units for producing control signals indicating the type of special storage operation to be performed in said central store, additional control input terminals connected to said operations gate means and connected to receive control signals from the selected one of said control units, said operations gate means being constructed to complete the connections from said information input terminals for carrying out said special storage operations between read and write operations occurring within a storage cycle and output terminal means connecting the information output from said operations gate means both to said central store and through said first register means to said selected control unit.

2. The improved data exchange system defined in claim 1, the operations gate means further comprising:

first, second and third AND gates and first, second and third OR gates and, wherein a first of said additional control inputs, selected by said write operation, controls said first AND gate through said first OR gate, the output of said first AND gate being connected to said third OR gate to pass information from said second information input terminal to said output terminal means without logic combination, wherein a second of said additional control inputs, selected by said read operation, controls said second AND gate through said second OR gate, the output of said second AND gate being connected to said third OR gate to pass information from said first information input terminal to said output terminal means without logic combination, wherein a third of said additional control inputs, selected by an operation command producing disjunctive combination, is connected through said first and second OR gates to open both said first and second AND gates, the outputs of said first and second AND gates being connected to inputs of said third OR gate and wherein a fourth of said additional control inputs, selected by an operation command producing conjunctive combination, controls directly said third AND gate, the output of which is connected to said third OR gate.

3. The improved data exchange system defined in claim 2 further comprising a fourth AND gate for completing a connection through said operations gate means for information contained in said central store or in said selected control unit and a further control input terminal connected to said operations gate means, said fourth AND gate having an input connected to said further control input and its other input connected to one of the first or second information input terminals supplying information from said central store or from said selected control unit.

4. The improved data exchange system defined in claim 1 further comprising clearing circuit means for connecting said output terminal means to said first register.

* * * * *